United States Patent
Zweighaft et al.

(10) Patent No.: US 7,126,779 B2
(45) Date of Patent: Oct. 24, 2006

(54) TAPE MEDIA IDENTIFICATION CODE

(75) Inventors: James Zweighaft, Boulder, CO (US); Michael Burke, Lafayette, CO (US)

(73) Assignee: Quantum Corporation, San Jose, CA (US)

( * ) Notice: Subject to any disclaimer, the term of this patent is extended or adjusted under 35 U.S.C. 154(b) by 162 days.

(21) Appl. No.: 10/497,294

(22) PCT Filed: Dec. 4, 2001

(86) PCT No.: PCT/US01/47415

§ 371 (c)(1), (2), (4) Date: May 28, 2004

(87) PCT Pub. No.: WO03/049110

PCT Pub. Date: Jun. 18, 2003

(65) Prior Publication Data

US 2005/0018355 A1    Jan. 27, 2005

(51) Int. Cl.
*G11B 19/02* (2006.01)

(52) U.S. Cl. ........................................ 360/69

(58) Field of Classification Search .................. 360/55, 360/48, 69, 71, 25, 132, 70, 72.1, 72.2; 714/702; 242/337
See application file for complete search history.

(56) References Cited

U.S. PATENT DOCUMENTS

| | | | | |
|---|---|---|---|---|
| 5,239,437 A * | 8/1993 | Hoge et al. | ................ | 360/132 |
| 5,325,255 A * | 6/1994 | Dodt et al. | ................ | 360/132 |
| 5,351,159 A * | 9/1994 | Dodt et al. | ................ | 360/132 |
| 5,369,532 A * | 11/1994 | Dodt et al. | ................ | 360/48 |
| 5,369,641 A * | 11/1994 | Dodt et al. | ................ | 714/702 |
| 5,420,727 A * | 5/1995 | Basham et al. | ................ | 360/48 |
| 5,526,198 A * | 6/1996 | Dodt et al. | ................ | 360/48 |
| 5,576,903 A * | 11/1996 | Brown et al. | ................ | 360/48 |
| 5,608,584 A | 3/1997 | Steinberg et al. | | |
| 5,612,827 A * | 3/1997 | Morita | ................ | 360/25 |
| 5,746,385 A * | 5/1998 | Leger et al. | ................ | 242/337 |
| 5,790,337 A | 8/1998 | Steinberg et al. | | |
| 5,820,055 A * | 10/1998 | Leger et al. | ................ | 242/337 |
| 5,850,980 A | 12/1998 | Koizumi | | |
| 5,956,198 A * | 9/1999 | Kulakowski et al. | ........ | 360/71 |
| 6,239,930 B1 * | 5/2001 | Dodt et al. | ................ | 360/48 |
| 6,270,030 B1 | 8/2001 | Johnson et al. | | |
| 6,867,942 B1 * | 3/2005 | Albrecht et al. | ............ | 360/69 |

FOREIGN PATENT DOCUMENTS

| | | |
|---|---|---|
| EP | 0 892 392 A | 1/1999 |
| GB | 2 266 402 A | 10/1993 |
| GB | 2 335 301 A | 9/1999 |
| WO | WO 99 53495 A | 10/1999 |

* cited by examiner

*Primary Examiner*—Fred F. Tzeng
(74) *Attorney, Agent, or Firm*—Morrison & Foerster LLP

(57) ABSTRACT

A tape media identification code for use with tape media enclosed in a tape cartridge having a form factor that is compatible with old generation tape drives. The present tape media identification code is recognized by new generation tape drives that take advantage of additional features of the enclosed tape media. Old generation tape drives are unable to recognize the present tape media identification code, thus treating the enclosed tape media as previous generation tape media. While old generation tape drives are unable to take advantage of the additional features of the enclosed tape media, the old generation tape drive is able to record and/or read data from the enclosed tape media. In an embodiment, the tape media identification code identifies a length of tape media having a length of cleaning media attached thereto.

9 Claims, 2 Drawing Sheets

TAPE MEDIA IDENTIFICATION CODE

FIELD OF THE INVENTION

The invention relates to digital tape cartridges, and in particular, to tape cartridges having a new generation tape type recognition code for identifying the tape media enclosed in a tape cartridge having the same form factor as old generation tape cartridges.

PROBLEM

It is a problem in the field of digital tape cartridges and tape drives to identify the type of tape media enclosed within the tape cartridge and to take advantage of the tape media features while also providing the new tape media within a tape cartridge that is compatible with old generation tape drives.

Single reel tape cartridges enclose a single supply reel on which is wound a length of magnetic tape. A corresponding takeup reel located in the tape drive allows the tape media to be to be transferred between the tape cartridge supply reel and the tape drive takeup reel as the tape drive transfers data to or from the tape media. Connecting the tape media on the supply reel to the takeup reel is accomplished utilizing a leader tab spliced onto the end of the tape media and a corresponding leader load mechanism located within the tape drive. The leader load mechanism catches the leader tab and pulls the leader tab and attached tape media toward the take up reel where the leader tab is attached.

The "form factor" of a tape cartridge refers generally to the peripheral dimensions of the cartridge and the interfacing characteristics with the tape drive. As newer types of tape media were introduced, it was desirable for the new tape media to be enclosed in a tape cartridge having the same form factor as existing tape cartridges. Utilizing the same form factor allowed the new tape cartridges to be compatible with existing tape drives. However, it became necessary for the tape drive to identify the characteristics of the enclosed tape media. This problem was solved by including a tape type coding on the edge of the tape media. The coding included identifying the beginning of the tape (BOT) and the end of tape (EOT) and the type of tape media that was enclosed in the tape cartridge.

Tape Type Coding

The tape type coding disclosed by Steinberg, et al. (U.S. Pat No. 5,608,584), utilized a tape type hole following the BOT hole. The distance between the BOT and the tape type hole is used by the tape drive to identify the type of media enclosed in the tape cartridge. The tape type is further defined with variations of the tape type hole. The tape type coding is used by the tape drive to format the tape in accordance with the particular type of tape enclosed. A tape drive incorporating a tape type identification apparatus is disclosed by Steinberg, et al. (U.S. Pat. No. 5,790,337). The tape drive disclosed by Steinberg, is compatible with tape cartridges having the same form factor without coding on the enclosed tape media. Lack of coding can be recognized by the tape drive to identify a default type of tape media.

Mechanical Apparatus

Modifications in the tape cartridges have been utilized to prevent one type of tape cartridge from being used in conjunction with an incompatible tape drive. One such apparatus described by Johnson, et al., (U.S. Pat. No. 6,270,030) provides a tab projecting from a surface of the tape cartridge to prevent insertion of the tape cartridge into the incompatible tape drive. Tape cartridges with the mechanical apparatus just described can only be used with new tape drives. In other words, the new tape cartridge is not downward compatible with existing tape drives.

The tape type coding method and apparatus just described fail to provide a method for a new generation tape drive to take advantage of new tape media contained in a tape cartridge while also providing a tape cartridge that is compatible for use with old generation tape drives that are unable to recognize the new tape media identification code.

For these reasons, a need exists for a new tape media identification that is recognized by a new generation tape drive to identify an additional feature of the tape media yet contains tape media that is also compatible with old generation tape drives even though the old generation tape drives can not take advantage of additional features of the enclosed tape media.

SOLUTION

The present tape media identification code overcomes the problems outlined above and advances the art by providing a tape media identification code that enables a new generation tape to identify tape media with additional features enclosed within a tape cartridge while also maintaining compatibility of the tape cartridge for use with old generation tape drives.

As previously discussed, single reel tape cartridges enclose a single supply reel on which is wound a length of tape media. A leader tab spliced to the tape media in conjunction with the leader load mechanism located in the tape drive allows the tape media to be attached to the takeup reel in the tape drive. Tape drives also include a sensing device that reads the identification coding holes provided in the tape media as the tape media is transferred between the supply reel and the takeup reel. An old generation tape drive does not detect the splice between the leader and the beginning of the tape media. Instead, the location of the splice is inferred by using the rotational position counters in the supply reel and the takeup reel to measure position of the tape as it is pulled from the supply reel during loading. Thus, a coding hole directly following the splice is not recognized by the tape drive unless sufficient distance exists between the splice and the coding hole. A new generation tape drive has the ability to differentiate between the splice and the coding hole and thereby read the coding hole and take advantage of the enclosed tape media features that are identified by the coding hole.

In an embodiment, the length of tape media being identified by the present tape media identification code is a new generation that includes a length of cleaning media attached to a length recording media. The new tape media identification code provides a hole located in close proximity to the splice point. A coding hole located in close proximity to the splice can not be differentiated from the splice in old generation tape drives, thus the old generation tape drive treats the tape media as a previous generation type. The distance between the present tape media identification coding hole and the splice is approximately two inches, however, the distance may vary according to the sensitivity of the sensing device located within the new generation tape drive.

The new identification method allows a new generation tape drive to take advantage of the cleaning media attached to the enclosed tape media. The tape cartridge enclosing tape media having the new coding has the same form factor as other tape cartridges and is therefore compatible with old generation tape drives. However, old generation tape drives are unable to recognize the new coding and therefore unable to take advantage of the attached cleaning media.

Providing a coding hole in close proximity to the splice provides a method for a new generation tape drive to recognize and take advantage of the enclosed recording media and additional features while providing a tape cartridge that is compatible for use with old generation tape drives.

DETAILED DESCRIPTION

The tape media identification code summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Figure 1:
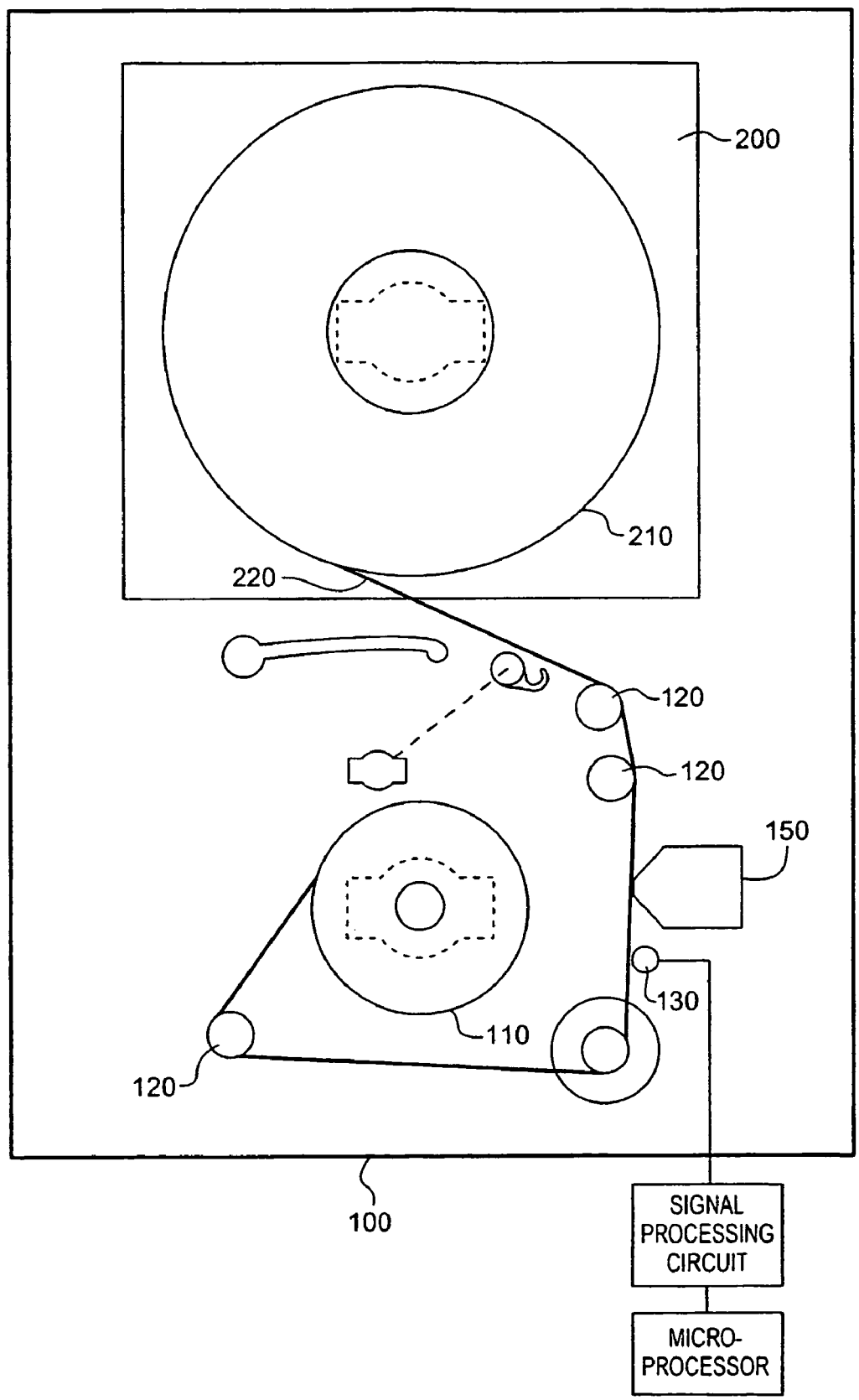
FIG. 1 illustrates a plan view of a tape drive.

The present tape media identification code is provided in the tape media enclosed within a tape cartridge that is compatible with an old generation tape drive. When the tape cartridge containing tape media having the present tape media identification code is used in conjunction with a new generation tape drive, the sensing device within the new generation tape drive identifies the additional feature. Referring to FIG. 1, tape drive 100 moves tape media 220 between the supply reel 210 located in the tape cartridge 200 and the takeup reel 110 located in the tape drive 100. As tape media 220 moves it is guided by guide rollers 120 and moves past sensing device 130 and past tape head 150. Placement of sensing device 130 close to the head assembly 150 allows sensing device to quickly respond to tape type coding located in the tape media 220.

Figure 2:
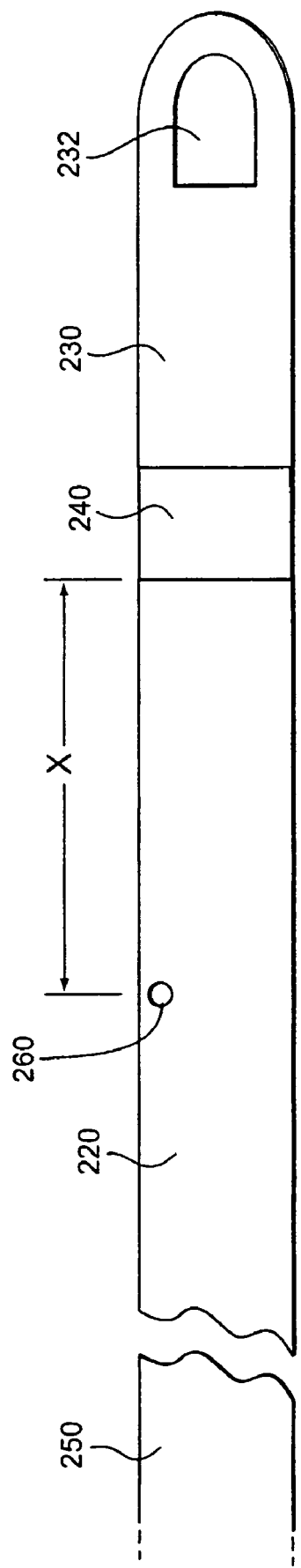
FIG. 2 illustrates a length of tape media utilizing the present tape type identification code hole.

The present tape media identification code provides a coding hole in the tape media and is recognized by a new generation tape drive. Referring to FIGS. 1 and 2, tape media 220 enclosed in a single reel tape cartridge 200 includes a leader tab 230 spliced to tape media 220. Leader tab 230 has a closed loop 232 at the end. A leader load mechanism in the tape drive catches leader tab 230 closed loop 232 when the tape cartridge 200 is inserted into tape drive 100. The leader load mechanism pulls leader tab 230 and attached tape media 220 toward takeup reel 110 located in tape drive 100. Closed loop 232 of leader tab 230 is deposited on takeup reel 110 in tape drive 100 for operation.

As leader tab 230, splice 240 and tape media 220 travel between tape cartridge 200 supply reel 210 and tape drive 100 takeup reel 110, a sensing device 130 located in tape drive 100 monitors the tape media 220. Tape drive 200 also includes other components commonly known in the tape drive art such as microprocessor and signal processing circuits that control tape drive operation. Microprocessor and signal processing circuits are conventional circuits and the processor is configured with software to operate in accord with the various embodiment of the present tape media identification. The software will be apparent to those skilled in the art in the context of the following discussion.

The sensitivity of the sensing device located within the new generation tape drive combined with the speed at which the tape media is transferred between the supply reel and the takeup reel are factors that influence the distance between the splice and the tape media identification code. When sensing device 130 detects a hole in the tape media 220, a signal is transmitted to the tape drive signal processing circuit.

In an embodiment of the present tape media identification code, the coding hole 260 illustrated in FIG. 2 is a circular hole located a distance X from the end of the splice 240. The distance X is preferably two inches, a distance that allows a newer generation tape drive to differentiate between splice 240 and coding hole 260. Old generation tape drives are unable to differentiate between splice 240 and coding hole 260 when coding hole 260 is located within approximately two inches of splice 240. In an embodiment, coding hole 260 is circular to identify tape media having a length of cleaning media attached thereto. In another embodiment, coding hole 260 may be elongated to identify another feature of the enclosed tape media.

Tape media 220 incorporating the new coding hole 260 includes a length of recording media with a length of cleaning media attached following the recording media. An old generation tape drive that does not detect the present coding hole is able to utilize the recording media, however, the old generation tape drive is unable to take advantage of the attached cleaning media. Providing a coding hole 260 that is not detectable by old generation tape drives allows tape cartridges enclosing the new tape media to be used with old generation tape drives and with new generation tape drives. This is significant since there are a plurality of old generation tape drives in the field. It also allows tape cartridges comprising tape media having coding hole 260 to be compatible with existing equipment such as automated tape cartridge libraries, loaders or other transport devices that use the exterior shape and edges of the tape cartridge for gripping, holding and moving the tape cartridge.

As to alternative embodiments, those skilled in the art will appreciate that the present tape media identification is compatible with old generation tape drives and provides a means for using additional features of the enclosed tape media when used with a new generation tape drive. While the new tape type identification code has been described and illustrated to identify a recording media with a length of cleaning media attached, the tape type code could be utilized to identify other tape media features.

It is apparent that there has been described a tape media identification code that fully satisfies the objects, aims, and advantages set forth above. While the tape media identification code has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A tape media identification code that identifies an additional tape media feature for a length of tape media enclosed in a single reel tape cartridge, the tape media having a leader tab, a length of tape media having the additional feature, and a splice connecting the leader tab to the tape media for use with a new generation tape drive having a tape type sensing device, the tape media identification code comprising:

a coding hole located in the tape media approximately two inches from the splice, wherein the splice and the coding hole are recognized by the new generation tape drive tape type sensing device to enable the new generation tape drive to take advantage of the additional feature of the tape media.

2. The tape media identification code of claim 1, wherein the coding hole is circular to identify the length of tape media having a length of cleaning media attached thereto.

3. The tape media identification code of claim 1, wherein the coding hole is elongated to identify an alternative additional feature.

4. The tape media identification code of claim 1, wherein the coding hole is located less than two inches from the splice.

5. The tape media identification code of claim 1, wherein the coding hole is located two inches from the splice.

6. The tape media identification code of claim 1, wherein the additional feature of the tape media comprises a cleaning media.

7. A tape media identification code to identify a tape media comprising a cleaning media attached to a length of recording media, the tape media further comprising a leader tab, and a splice connecting the leader tab to the length of recording media for use with a new generation tape drive having a tape drive sensing device, the tape media identification code comprising:

a coding hole located in the length of recording media approximately two inches from the splice is recognized by the new generation tape drive to enable the new generation tape drive to take advantage of the attached cleaning media.

8. A single reel tape cartridge, comprising:

a leader tab;

a recording media;

a splice connecting the leader tab to the recording media;

a coding hole located in the recording media approximately two inches from the splice; and an additional media connected to the recording media, wherein the coding hole is recognized by a new generation tape drive to utilize the additional media and the tape cartridge is compatible with an old generation tape drive incapable of recognizing the coding hole.

9. The tape cartridge of claim 8, wherein the additional media comprises a cleaning media.

* * * * *